United States Patent [19]

Komori et al.

[11] 4,007,986

[45] Feb. 15, 1977

[54] COPYING APPARATUS

[75] Inventors: Shigehiro Komori, Yokohama; Hajime Katayama, Tokyo; Masashi Suda, Iruma, all of Japan

[73] Assignee: Canon Kabushiki Kaisha, Tokyo, Japan

[22] Filed: Dec. 19, 1974

[21] Appl. No.: 534,160

[30] Foreign Application Priority Data

Dec. 28, 1973 Japan .................................. 48-924

[52] U.S. Cl. ...................................... 355/57; 355/8; 355/60

[51] Int. Cl.[2] ........................................ G03B 27/34

[58] Field of Search .................. 355/56, 57, 58, 59, 355/60, 8, 55

[56] References Cited

UNITED STATES PATENTS

| | | | |
|---|---|---|---|
| 3,286,587 | 11/1966 | Hayden et al. | 355/57 |
| 3,355,236 | 11/1967 | Laillie et al. | 355/57 X |
| 3,556,655 | 1/1971 | Lux et al. | 355/57 X |
| 3,703,334 | 11/1972 | Knechtel | 355/58 X |
| 3,709,603 | 1/1973 | Furiuchi | 355/57 X |
| 3,733,128 | 5/1973 | Naumann | 355/57 X |
| 3,837,743 | 9/1974 | Amemiya | 355/57 X |
| 3,865,482 | 2/1975 | Bandall et al. | 355/57 X |

*Primary Examiner*—Edna M. O'Connor
*Attorney, Agent, or Firm*—Fitzpatrick, Cella, Harper & Scinto

[57] ABSTRACT

In a copying apparatus of the type having a movable original carriage, there is provided drive velocity changing means for changing the drive velocity of the original carriage relative to an image forming member. Movable optical means is provided which has at least a mirror and a lens. One or both of the mirror and the lens may be moved or changed over in response to the drive velocity changing means, thereby changing the magnification at which an original is copied.

7 Claims, 17 Drawing Figures

COPYING APPARATUS

BACKGROUND OF THE INVENTION

1. Field of the Invention

This invention relates to a copying apparatus of the movable original carriage type and which enables originals to be copied at variable magnification (from reduction to enlargement).

2. Description of the Prior Art

Heretofore, copying of differently sized originals has been carried out by selecting corresponding sizes of copy mediums. However, a single size determined for copy mediums would generally be convenient for higher efficiency of office work and economy of copy mediums, as well as for the filing of produced copies. In addition, copying on reduced scales could not only contribute to the saving of copy mediums but would also eliminate the necessity of changing the copy mediums for different sized originals.

Also, in the slit-exposure type copying apparatus as represented by the movable carriage type copying apparatus, displacement of a mirror and a lens to effect magnification change would only require the scanning position of the object to be displaced parallel to the scanning direction and thus, would only require the starting point for scanning of the original to be changed in parallel, thus eliminating any special mirror for examining the position of the slit relative to the original. This in turn would lead to minimization of the number of mirrors used. Moreover, both mirrors and lenses may be of the fixed type which would readily ensure higher accuracy of their performance after displacement.

Usually, however, copying at varied magnification involves the following two procedures which would complicate the construction.

1. Modification of the length of the optical path.
   a. displacement of mirror and lens
   b. interchange between lenses of different focal lengths
2. Change of the relative velocity of the object and the photosensitive medium.

SUMMARY OF THE INVENTION

It is therefore an object of the present invention to provide a copying apparatus which enables magnification to be changed by means of a very simple construction.

It is another object of the present invention to provide a copying apparatus of the movable original carriage type in which a mirror and a lens may be moved or changed over for the purpose of magnification change.

It is a still another object of the present invention to provide a copying apparatus in which a mirror and/or a lens may be moved on screw shafts of different pitches in a correlated manner to effect magnification change.

It is a further object of the present invention to provide a copying apparatus in which a mirror and/or a lens may be moved by a cam.

The present invention is very simple to construct and easy to practice since the modification of the length of the optical path for the magnification change may be accomplished by moving or changing over a lens and/or a mirror. Further, the magnification change can be effected not only selectively but also continuously.

The invention will become more fully apparent from the following detailed description of some embodiments thereof taken in conjunction with the accompanying drawings.

DESCRIPTION OF THE PREFERRED EMBODIMENTS

Figure 1:
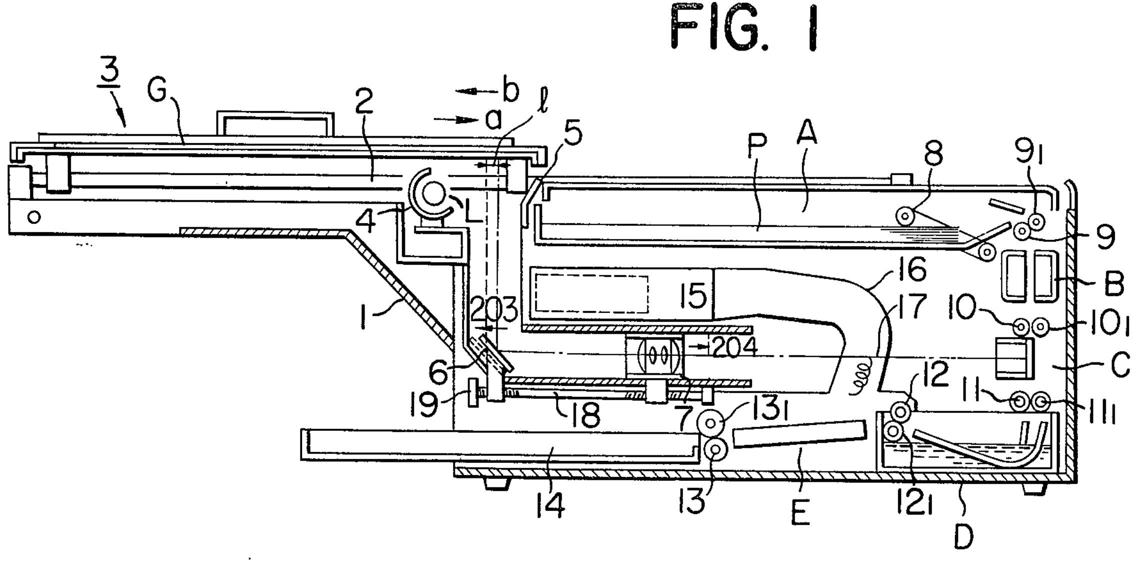
FIG. 1 is a longitudinal section showing an embodiment of the copying apparatus according to the present invention.

Referring to FIG. 1, it shows an embodiment of the present invention in which a photosensitive medium provides a final image bearing member. In operation, an original carriage 3 is moved forwardly in the direction of arrow *a* along rails 2 extending parallel to each other above a machine frame 1, and then moved backwardly in the direction of arrow *b* from the end of the forward stroke. During the backward stroke of the carriage, an original G is illuminated by a lamp L provided with reflectors 4 and 5 so that the light reflected from the original is directed by a mirror 6 and a lens 7 so as to be focused on a photosensitive medium P as it passes through an exposure station C. When the original carriage comes to a temporary halt at the end of its backward stroke or its initial position, the original on the carriage 3 may be replaced by another one.

When the original carriage has reached the end of its forward stroke, the uppermost one of the sheets of photosensitive medium P piled in a feed portion A is fed by a feed roller 8 and transported by transport rollers 9, $9_1$, 10, $10_1$, so that the entire surface of the photosensitive sheet is uniformly charged by a charger at a charging station B, whereafter the photosensitive sheet is subjected to slit-exposure at the exposure station C, as described, in synchronism with the backward movement of the original carriage 3, whereby an electrostatic latent image is formed on the surface of the photosensitive sheet. Subsequently, the photosensitive sheet is developed at a developing station D and any excess developer on the photosensitive sheet is squeezed out by squeeze-transport rollers 12, $\mathbf{12_1}$, whereafter the photosensitive sheet is passed through a drying station E and discharged into a tray 14 by transport rollers 13, $\mathbf{13_1}$. The warm air adjacent the illuminating lamp L is drawn by a blower 15 and passed through a duct 16, in which the air is suitably heated by a heater 17 and used to dry the photosensitive sheet at the drying station E.

In the above described construction, it is imperative that the velocity of movement of the original during exposure and the velocity of movement of the photosensitive medium be accurately synchronous with each other in accordance with the magnification desired.

Figure 2:
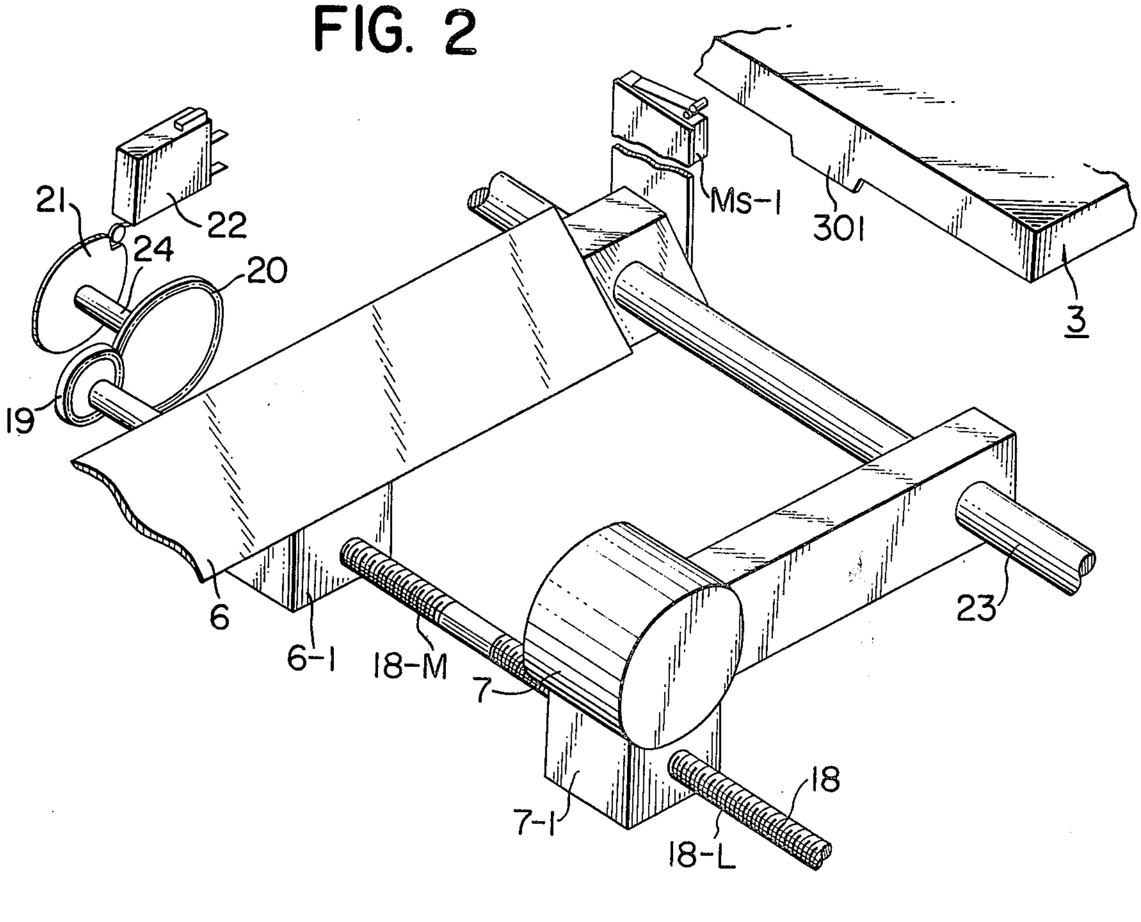
FIG. 2 shows a mirror and lens mechanism in the copying apparatus of the present invention.
Figure 3:
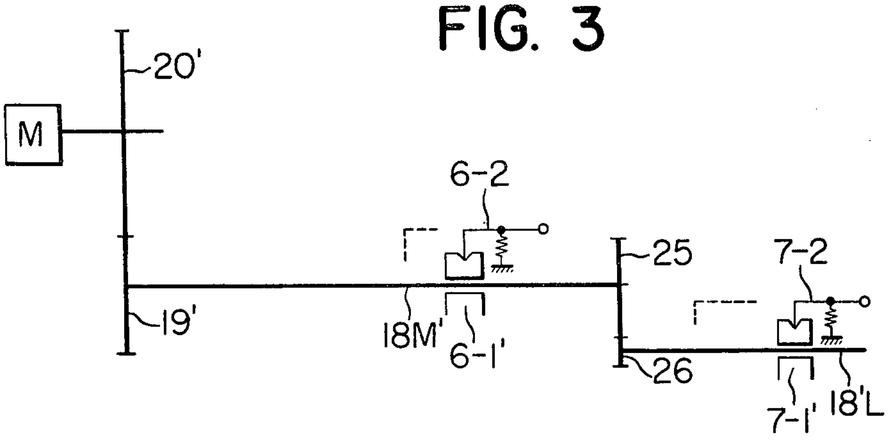
FIGS. 3 and 4 show a mirror and lens moving mechanism according to the present invention.

In the magnification changing mechanism of the present invention, change of the magnification from full-size copy to reduced-size copy only requires the support members for the lens 7 and mirror 6 to be moved in the direction of arrows 203 and 204, respectively, in response to the rotation of a screw shaft 18. More specifically, in FIG. 2, the lens 7 and mirror 6 are supported for free movement on a shaft 23 so that they are movable in response to rotation of the screw shaft 18. Assuming that the focal length of the lens is 180 mm and that the magnification is to be reduced from 1.0 to 0.8 (namely, from size B4 to size A4), then the amount of mirror movement will be 9 mm and the amount of lens movement will be 36 mm. Hence, if the lens-driving portion of the screw shaft is a left-hand screw 18-L of pitch 4 mm and the mirror-driving portion of the screw shaft is a right-hand screw 18-M of pitch 1 mm and if the screw shaft is driven by gears 19 and 20 whose gear ratio is 1 : 3, then a notch formed in a disc 21 fixed on the screw shaft will be detected by a microswitch 22 when the shaft has made three complete rotations, and by stopping the drive to the gear 24 at such point, the intended purpose may be achieved. In accordance with a similar concept, the screws 18-L and 18-M need not be coaxial and may be separately driven. An example of the latter design is schematically shown in FIG. 3. As shown there, use is made of a pair of gears 20' and 19' at a gear ratio of 2 : 1, a pair of gears 25 and 26 at a gear ratio of 4 : 1, and left-hand and right-hand screws 18'L and 18'M of pitch 4.5 mm each, and a complete rotation of the gear 20' may achieve movement to a predetermined position. Screws usually suffer from more or less backlash and therefore, the support members 6-1 and 7-1 for the mirror and lens may normally be biased in one direction by springs or like means to eliminate the backlash, or alternatively the support members may be positionally controlled by such means as lock members 6-2 and 7-2.

Figure 4:
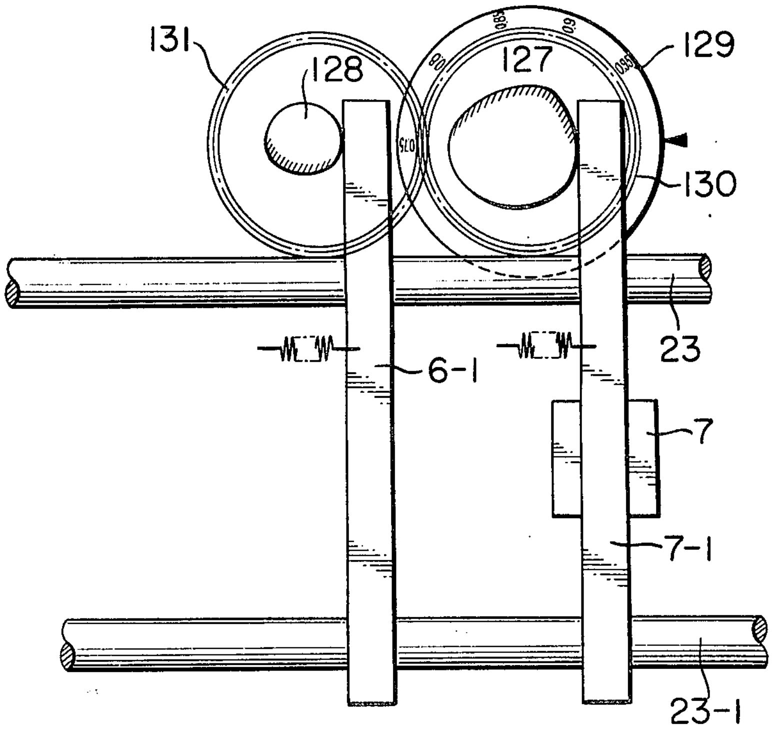

In the foregoing embodiment, the drive source for the mirror and lens may be any known means such as an electric motor, man power and others. Although not shown, the screw shaft may be replaced by a combination of a rack and a pinion, with the same result. Also, a method of movement utilizing cams may be adopted as shown in FIG. 4. When such method is adopted, stageless change of magnification may be provided by considering the configurations of the cams. More specifically, any desired magnification may be selected by designing such a cam that will provide various amounts of movement which can infinitely be calculated as in the following table.

for $f$=180 mm

| For f=180 mm | | | | | | |
|---|---|---|---|---|---|---|
| Magnification | ×1 | ×0.95 | ×0.9 | ×0.85 | ×0.8 | ×0.75 |
| Amount of Mirror Movement (mm) | 0 | 0.52 | 2 | 4.76 | 9 | 15 |
| Amount of Lens Movement (mm) | 0 | 9 | 18 | 27 | 36 | 45 |

In FIG. 4, a lens-moving cam 127 is designed such that the upper (shaded) portion thereof is used in response to rotation of a magnification dial 129, and a mirror-moving cam 128 is designed such that the lower (shaded) portion thereof is used. Gears 130 and 131 of the same gear ratio are in engagement, and the mirror support member 6-1 and the lens support member 7-1 may be moved to their appropriate positions in accordance with setting of the magnification. Of course, the drive source is not restricted to manual means but use may be made of an escapement mechanism or the like which utilizes a rotary solenoid.

In the embodiment of FIG. 1, the movement of the mirror 6 causes deviation of the scanning position of the original carriage and this gives birth to a necessity that the control means be operated with a corresponding delay, which in turn offers the greatest problem of registration. The simplest method of solution would be either to use a timer or the like to delay the start of rotation of the control means, or to effect the feed timing by using a cam 301 provided on the original carriage and a microswitch MS-1 displaced by the amount of movement of the mirror (the microswitch being integrally attached to the mirror support member 6-1) as shown in FIG. 2. This will more particularly be described in connection with FIG. 17.

Figure 5:
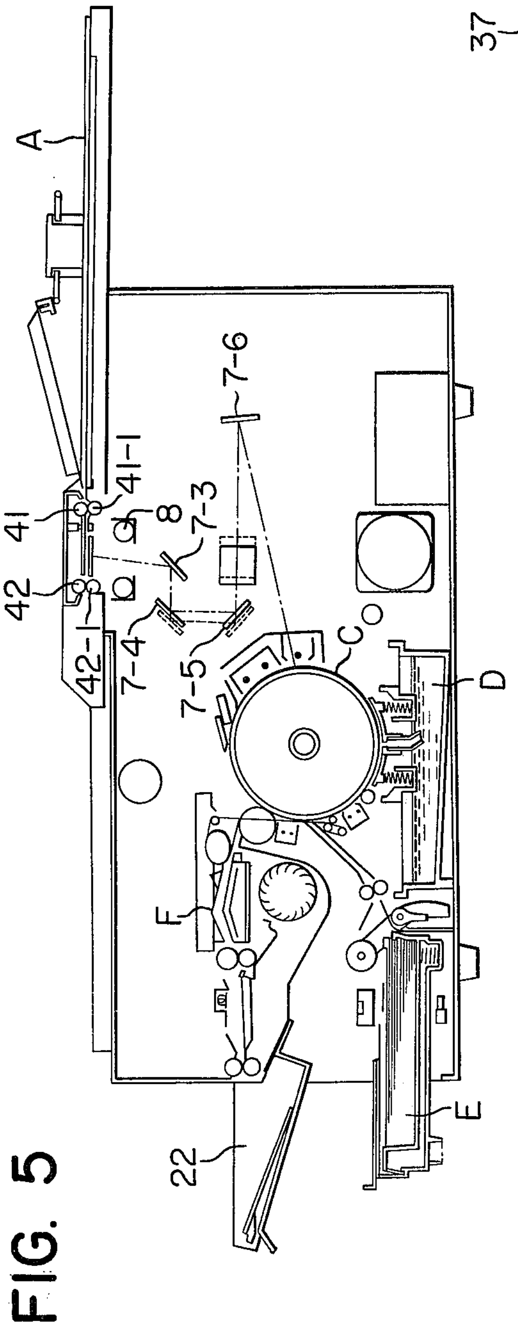
FIG. 5 is a longitudinal section showing another embodiment of the copying apparatus according to the present invention.

FIG. 5 shows, in cross section, a copying apparatus of the transfer type to which the present invention is applicable. In such apparatus, mirrors 7-4 and 7-5 are moved together and their amount of movement is half that described above. Excepting for this point, the lens and mirrors may be moved to the dotted-line positions by the use of any of the devices as previously described, thereby providing copies of varied magnification. Such embodiment requires no change in the position of the slit relative to the original on the carriage and the feed timing or other control systems.

Figure 6:
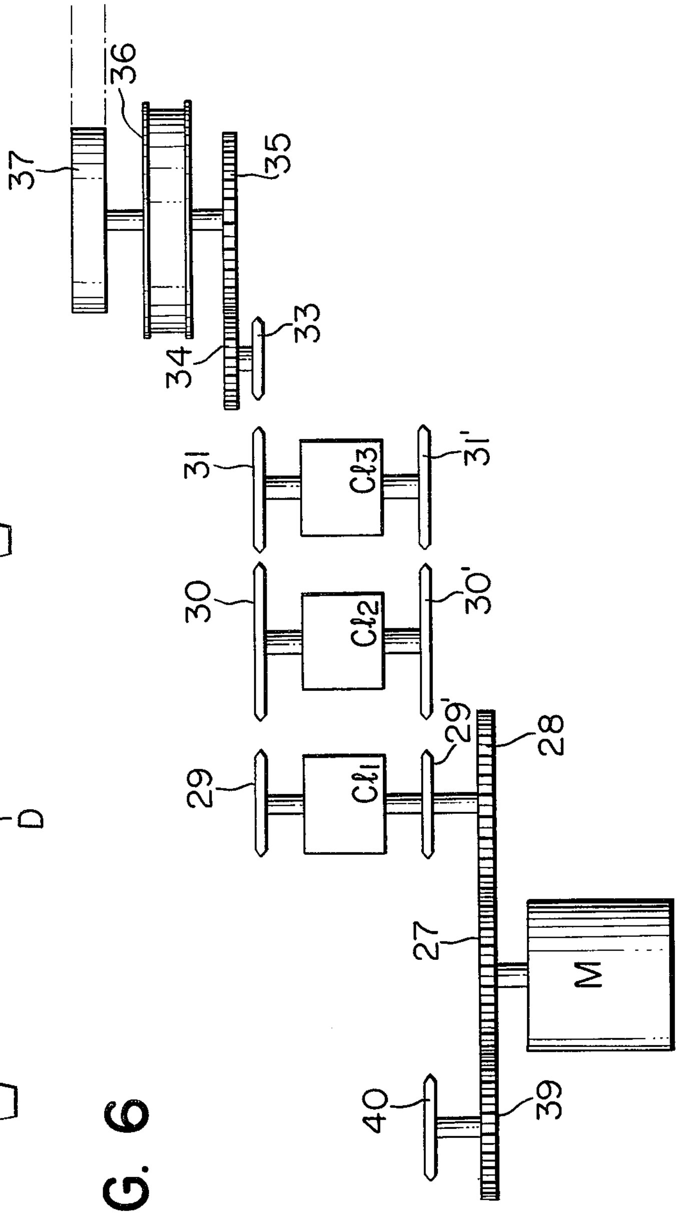
FIG. 6 schematically illustrates the speed changing mechanism for photosensitive medium and original carriage.
Figure 7:
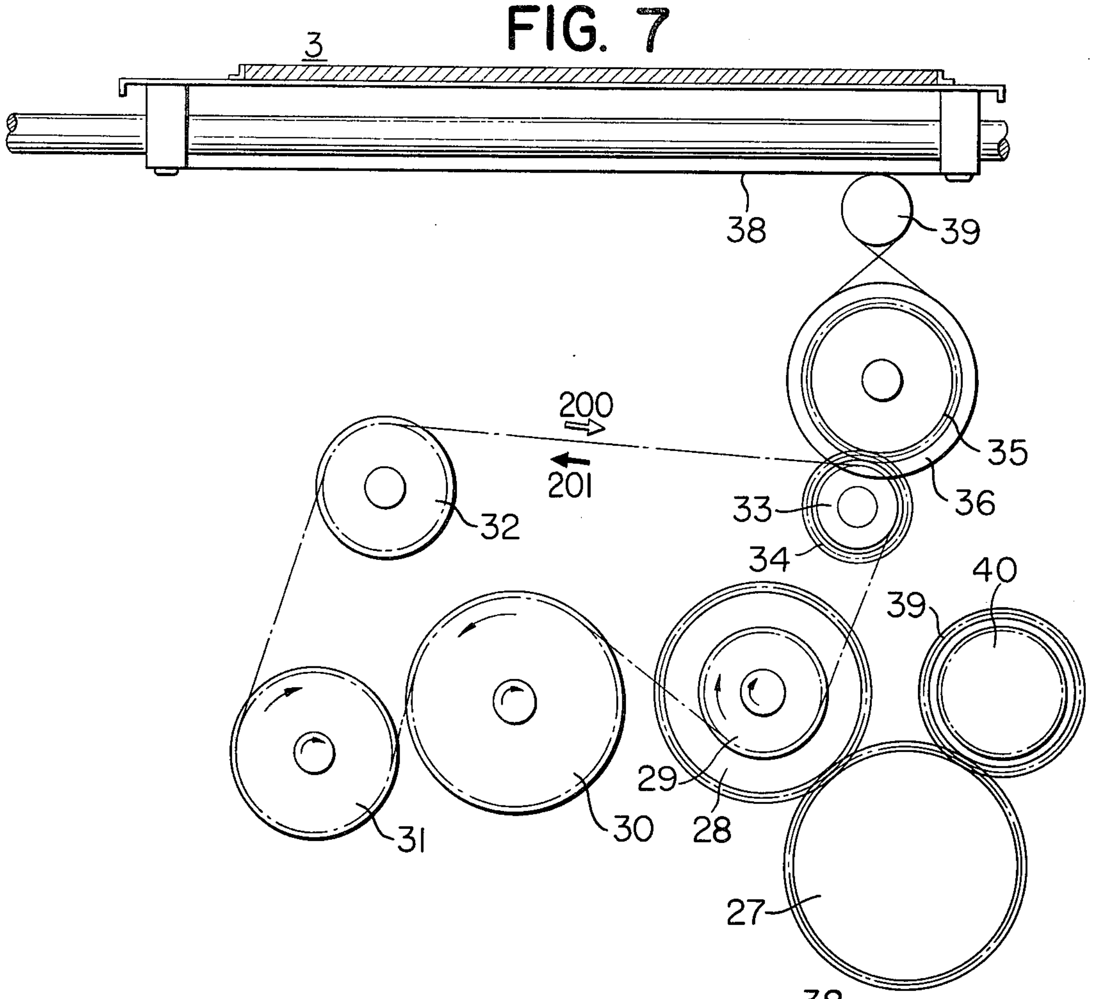
FIGS. 7 and 8 illustrate the mechanism for reciprocating the original carriage.

Description now will be made of the change of the relative velocity of the photosensitive medium and the original carriage which is another factor for the production of copies of varied magnification. Referring to FIGS. 6 and 7, a gear 27 driven from a drive source M rotates a gear 39 which in turn rotates a chain sprocket 40, which also drives a photosensitive medium driving shaft (members 9, 10, 11, etc. in the embodiment of FIG. 1). Thus, the velocity of photosensitive medium is invariable. A train of sprockets 29', 30', 31', to which rotation is transmitted through a gear 28, are connected together by a chain so as to rotate in the same direction. A train of sprockets 29, 30, 31 are mounted on the other ends of the respective shafts and connected to the aforesaid sprockets with electromagnetic clutches $C1_1$–$C1_3$ interposed therebetween, and a pulley 36, having a carriage driving wire wrapped thereabout, is connected to the sprockets 29–31 and further sprockets 32 and 33 through gears 34 and 35 to which the drive is transmitted from the train of sprockets 29–33. A timing pulley 37 is provided to drive original transport rollers 41, 41-1, 42, 42-1 for sheet copies used in the embodiment of FIG. 5. The chain is entrained in such a manner that, as shown in FIG. 7, the sprocket 30 rotates in the direction opposite to the direction in which the other sprockets are rotated. Thus, when one of the clutches $C1_1$ and $C1_3$ is operated, the chain will be driven in the direction of arrow 200, and when the clutch $C1_2$ alone is operated, the chain will be driven in the direction of arrow 201. In accordance with the magnification selected for copies, the wire 38 in the embodiment of FIG. 7 is pulled to reciprocate the original carriage, in such a manner that for the magnification of $1x$, the rotation of the sprocket 29 governs the rotational velocity of the pulley 36 by the clutch $C1_1$, that for the magnification of $0.8x$, the rotation of the sprockets 31 govern the rotational velocity of the pulley 36 by the clutch $C1_3$ and that for the backward movement, the rotation of the pulley 36 is reversed by the clutch $C1_2$. Of course, the pulleys 36 and 39 may be replaced by pinions and the wire 38 by a rack coupled to the original carriage, to achieve the intended purpose. It will be apparent that the sprockets 29, 29', 31 and 31' are combined so as to provide a predetermined velocity. Also, if the gears 34 and 35 in FIG. 6 are replaced by a stageless transmission the velocity of movement of the original carriage could be changed in a stageless manner and thus, by using such transmission with the embodiment of FIG. 4, any desired magnification could be provided for copies.

Figure 8:
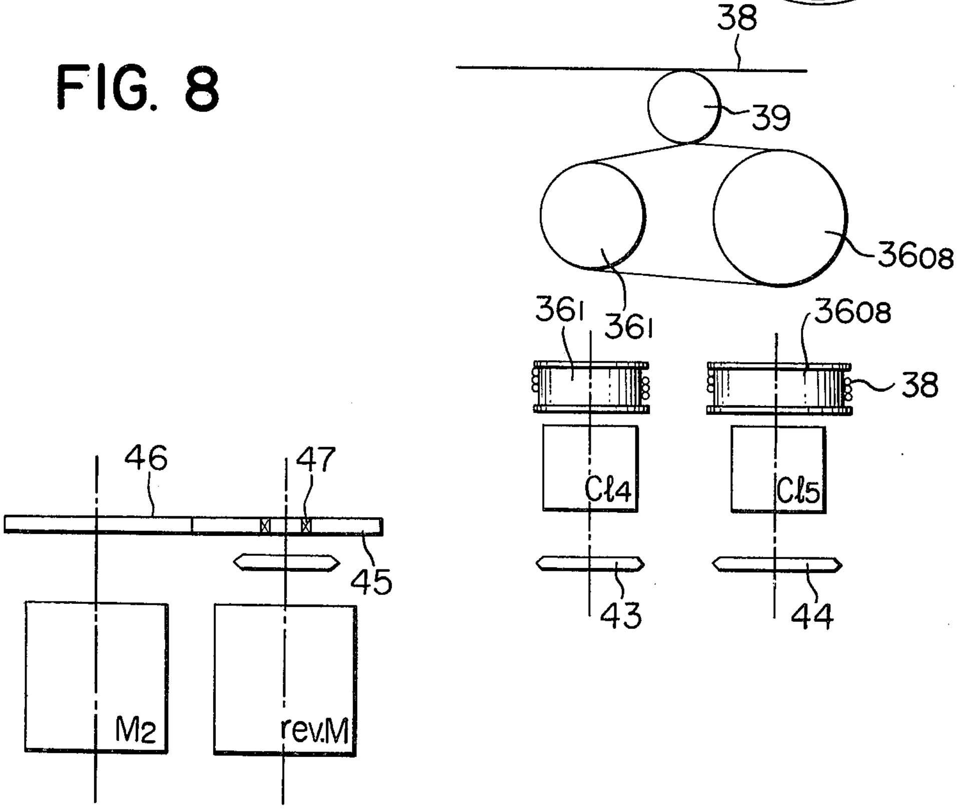

FIG. 8 shows another embodiment of the present invention. An original carriage driving pulley $\mathbf{36}_1$ for full-size magnification and an original carriage driving pulley $\mathbf{36}_{08}$ for $0.8x$ magnification are engaged with clutch means $C1_4$ and $C1_5$, respectively, and a reversible rotary motor rev. M may drive sprocket wheels 43 and 44. The clutch $C1_4$ or $C1_5$ may be selected by a magnification changing switch to vary the velocity of movement of the original carriage. The reversal of movement of the carriage may be accomplished by reversing the rotation of the reversible motor rev.M. For the conveyance of photosensitive medium, drive may be imparted from a motor $M_2$ which imparts to a gear 46 a peripheral velocity slightly lower than of a gear 45 attached to the motor rev.M. Of course, the gear driven from the motor rev.M is provided with a one-way clutch 47 so that during reverse rotation no drive is transmitted to the gear 46 but, only during normal rotation, the gears 46 and 45 are rotated at the same peripheral velocity.

Figure 9:
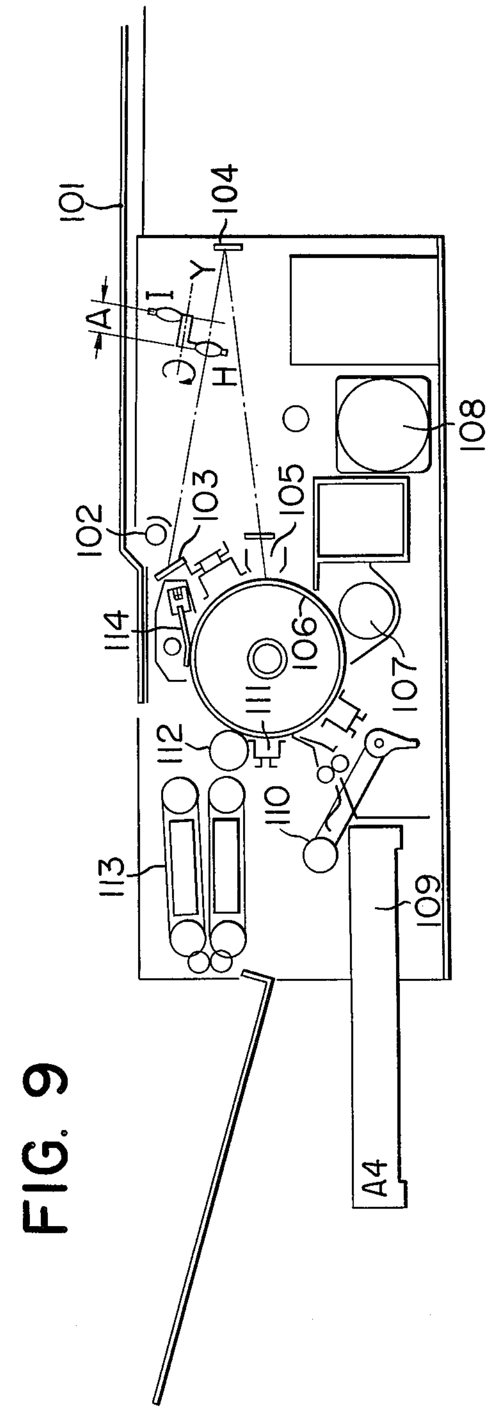
FIG. 9 is a longitudinal section showing a third embodiment of the copying apparatus according to the present invention.

Although some examples of the method of moving the lens and mirror have been mentioned above, they may be converted to a turret type design as shown in FIG. 9, wherein a plurality of lenses of different focal lengths may be adjusted to a variable magnification and a holding shaft Y for the lens system may be rotated manually or by a suitable drive source. The different focal lengths are maintained in the following relations:

$$F = \frac{4m}{(1+m)^2} f$$

where $f$ is the focal length of the full-size magnification lens and $m$ is the magnification. Also, the distance of the lens is maintained in the following relation:

$$X = \frac{1-m}{1+m} 2f$$

and substitution may be done in such equation. Since, in this case, the slit position on the surface of the object and on the focal plane is invariable, change of the lenses and change in the velocity of movement of the original carriage are the only factors that need considerations. In FIG. 9. the apparatus includes an original carriage 101, an illuminating lamp 102, stationary mirrors 103 and 104, a AC deelectrifier 105, a photosensitive plate 106, a developing device 107, a main motor 108, a cassette 109, a feed roller 110, a transfer charger 111, a separator roller 112 and a fixing device 113.

In and outside the optical path of the above described apparatus, a full-size magnification lens H and a magnification changing lens I integral with the lens H but having a different focal length are held on a rotatable shaft Y so as to satisfy the relation that $$A = \frac{1-m}{1+m} 2f.$$

As described above, the shaft may be rotated in a turret-like fashion by manual or motor drive to effect lens interchange and thereby change the magnification.

Figure 10:
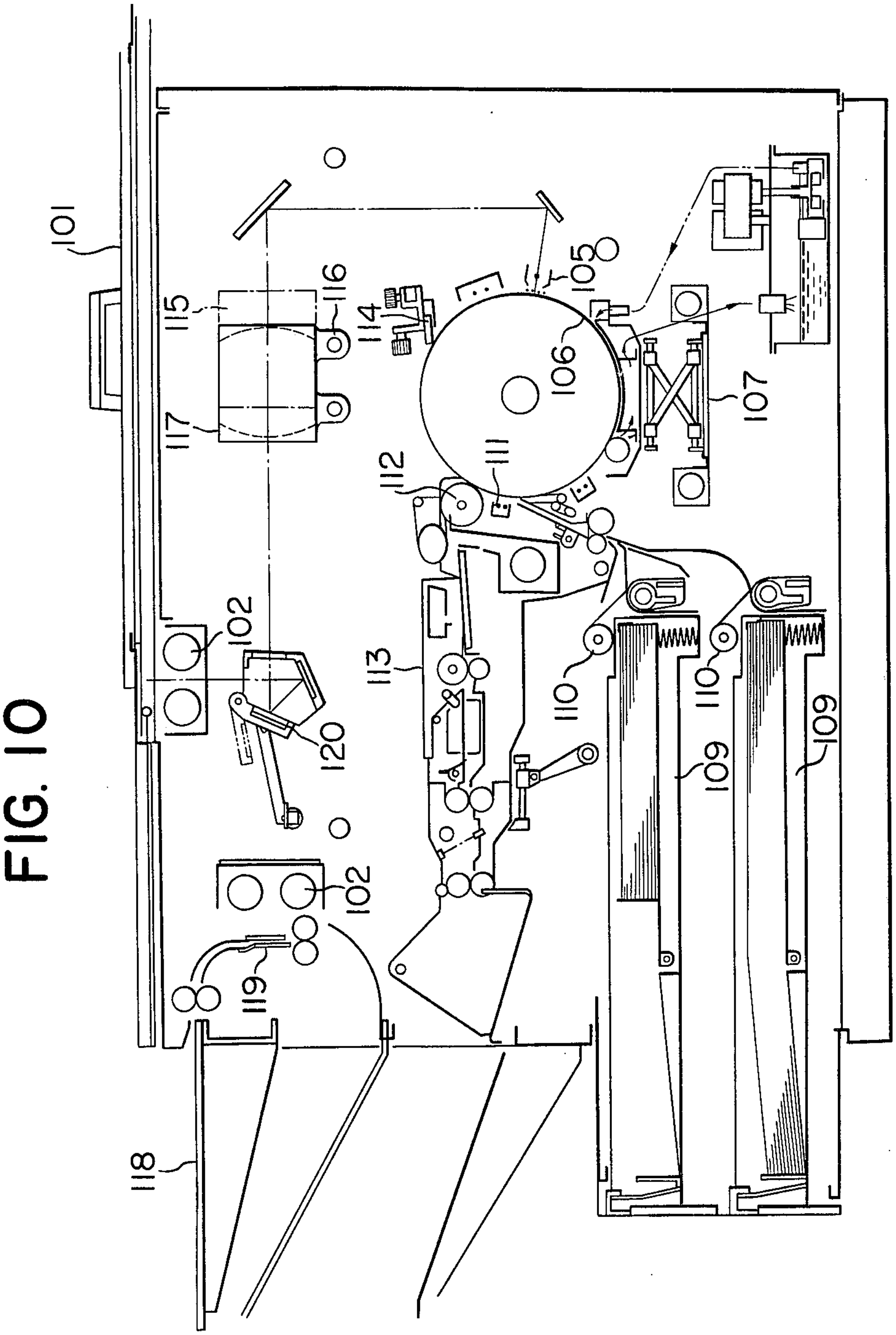
FIG. 10 is a longitudinal section showing a fourth embodiment of the copying apparatus according to the present invention.

FIG. 10 shows a copying apparatus of the movable carriage type in which a full-size magnification lens 117 and a scale reducing lens 115 are disposed side by side in a horizontal portion of the optical path and slidable in rails 116 to effect lens interchange.

Figure 13:
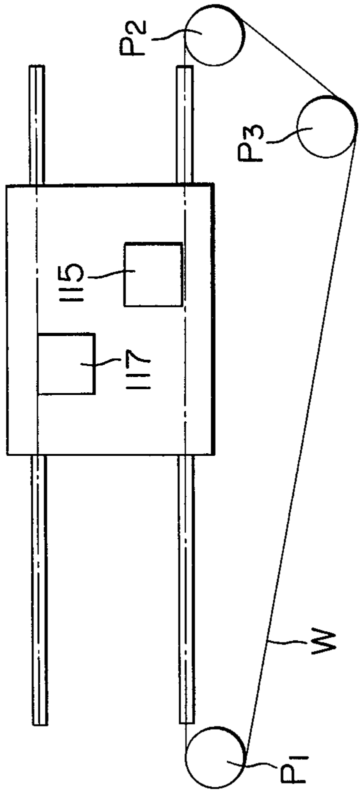
FIGS. 11, 12 and 13 schematically illustrate examples of the lens movement in the copying apparatus of the present invention.
Figure 12:
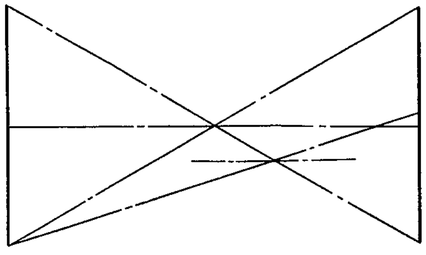
Figure 11:
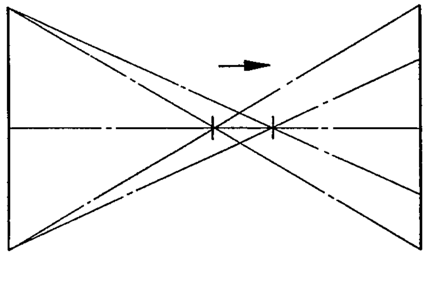

This apparatus includes not only an exposure system for book-like originals but also an exposure system for sheet originals only and, when a sheet original is to be copied, a mirror 120 shifts to the dotted-line position to permit an image on an exposure window 119 to be focused on a drum 106. As shown in a plan view of FIG. 13, the lenses 117 and 115 on the lens mount are driven by a wire W entrained over deflecting pulleys P1 and P2 and driving pulley P3, which is connected to the above described drive means. In this embodiment, the optical axis of the lens may be deviated with respect to the center of the object, as desired. When the lens and mirror are simply moved together only in one direction, the image will be reduced in scale symmetrically about the optical axis as shown in FIG. 11, so that an image will be formed, as it were, centrally of the copy medium. This may not substantially lead to economy of copy medium. In the present embodiment, however, scale-reduction can be accomplished with the imaging position registered to one edge of the copy medium, as shown in FIG. 12. This is highly practical in that magnification for copies can be changed without the necessity of changing the cassette or the feed table from those used during full-size magnification.

Figure 15:
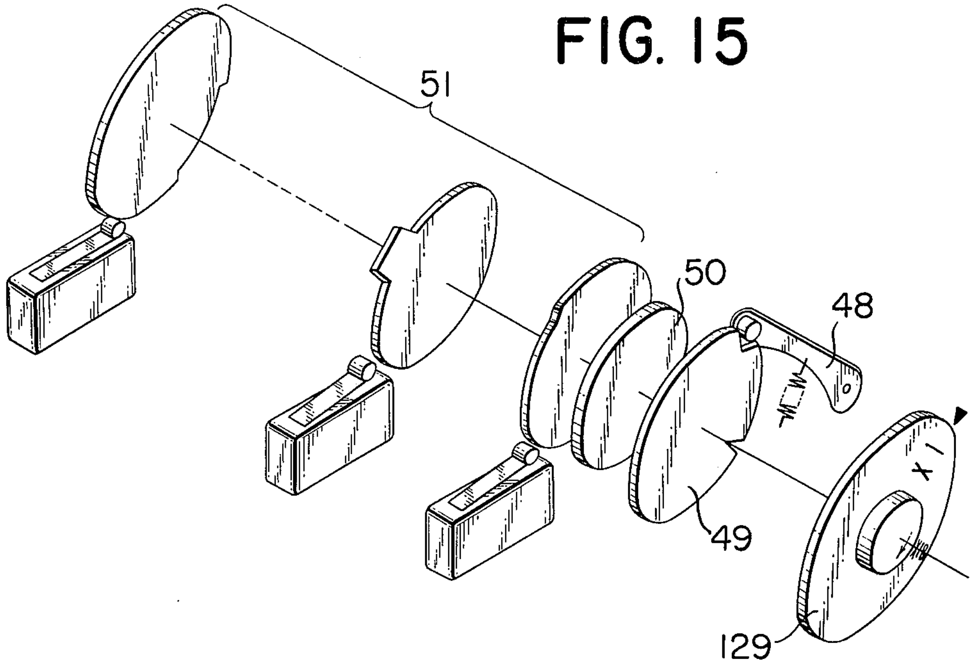
FIGS. 14 and 15 schematically show the control mechanism for adjusting the deviation of the original carriage in the copying apparatus of the present invention.
Figure 14:
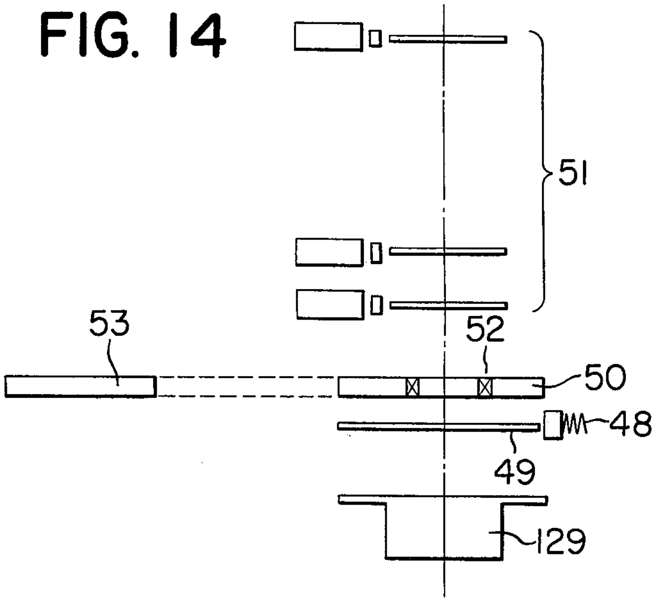
Figure 16:
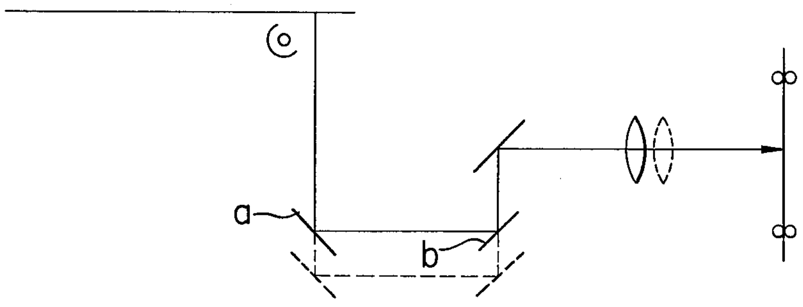
FIG. 16 shows an example of the mirror movement in the present invention.

In the embodiments described hitherto, the position of the slit relative to the object is invariable, but in such an embodiment as shown in FIG. 1 wherein the position of the slit is variable, it is recalled that the control system mainly for feeding must be delayed. For this purpose, in FIGS. 14 and 15, a size changing lever 129 may be rotated manually or automatically until a positioning plate 49 is locked by a lock 48. Thereby, a group of controllers is caused to effect control with a time delay corresponding to the distance 1 in FIG. 1. Designated by 52 is a one-way clutch press-fitted in a controller driving gear 50. Thus, the clutch is free from the rotational direction of the magnification changing dial 129 and, while magnification change is being set, the clutch is mechanically connected to the drive source for the original carriage and so forth. This prevents movement of the gear and accordingly, prevents occurrence of any trouble in control.

Adjustment of the length of the optical path effected, as described, by movement of the mirror 6 which directly scans the photosensitive medium P or the original carriage tends to accompany various incidental problems. A better arrangement is shown in FIG. 5 wherein mirrors 7-3 and 7-6 directly looking into the original and the photosensitive medium are stationary while the other mirrors 7-4 and 7-5 are movable. However, even in the arrangement as shown in FIG. 1 wherein the mirror directly looking into the original or the photosensitive medium is moved, no problem will occur if the mirror movement occurs in the direction of the optical axis.

Figure 17:
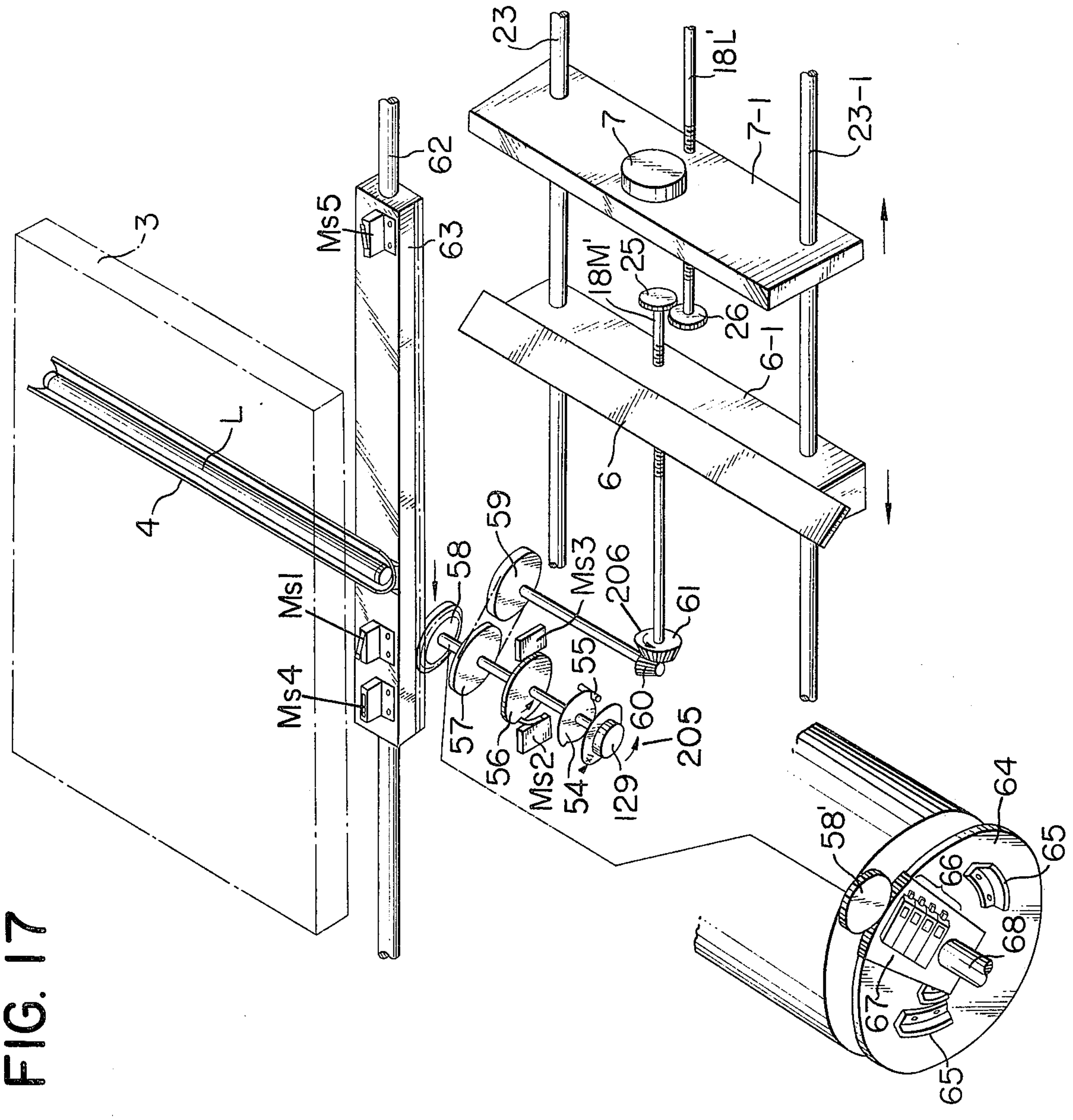
FIG. 17 is a perspective view of a mechanism necessary for effecting magnification change in the copying apparatus of the present invention.

FIG. 17 shows an embodiment for operating all the mechanisms required to effect magnification change in accordance with the rotation of the magnification changing lever 129. In this embodiment, the optical system is that shown in FIG. 1 which employs a fewer number of mirrors. Therefore, the stroke of the original carriage during scanning and the feed timing can be accomplished by a single operation. This will now be described with reference to the drawing.

The magnification changing lever 129 is permitted to effect one-half rotation by a stop ring 54 and stop 55. If magnification is to be changed from $1x$ to $0.8x$, the lever 129 may be rotated in the direction of arrow 205 to displace the notch of a disc 56 so as to open a microswitch MS2 for controlling the full-size magnification clutch $C1_1$ (see FIG. 7) and to close a microswitch MS3 for controlling the $0.8x$ magnification clutch $C1_3$. The rotation of the lever 129 further causes a racked carriage 63 to be moved leftwardly by a distance 1 (see FIG. 1) on a shaft 62, the racked carriage 63 carrying thereon an original carriage stopping microswitch MS4, a feeding microswitch MS1 and an original carriage reversing microswitch MS5. Simultaneously therewith, a sprocket 57 moves the chain which in turn rotates a sprocket 59 and a bevel gear coaxial therewith. This also causes a bevel gear 61 meshing with the bevel gear 60 to be rotated in the direction of arrow 206, so that the screw shaft 18M' is rotated to move the mirror mount 6-1 leftwardly while rotating the gears 25 and 26 to rotate the screw shaft 18L' which thus moves the lens mount 7-1 rightwardly. The original illuminating lamp L supported on the racked carriage 63 is also moved by a distance 1.

When a drum type copying apparatus, as shown in FIG. 5 is used in an arrangement similar to that of FIG. 1, as will readily be apparent, control is often effected by providing a control cam 65 on a gear 64 coaxial with the drum and by using a microswitch 66 to detect such cam 65. In such embodiment, instead of using the pinion 58, a sector 67 carrying microswitches thereon may be rotatably mounted on the shaft 68 of the copying drum and such sector may be rotated by a gear 58', whereby the points of time at which controls are initiated may be uniformly delayed.

We claim:

1. A copying apparatus for varying the magnification of images projected from an original onto a recording member comprising:

a reciprocable original carriage;

means for producing an image of the original;

optical means for projecting the image from a scanning position, said optical means including a mirror and lens combination movable to vary the magnification of the projected image and wherein said scanning position varies with movement of said mirror and lens combination;

means for moving the recording member past the projected image to thereby form an image on the recording member; and control means for actuating said moving means in accordance with the position of said mirror and lens combination.

2. A copying apparatus according to claim 1, wherein said moving means includes feed rollers for a photosensitive recording sheet.

3. A copying apparatus according to claim 1, further comprising cam means for moving said mirror and lens combination.

4. A copying apparatus according to claim 1, wherein said control means is operatively connected with the mirror and lens arrangement for movement therewith.

5. A copying apparatus according to claim 1, further comprising a control member operatively associated with said optical means and including switching means mounted thereon to control the reciprocal movement of said original carriage.

6. A copying apparatus according to claim 5, wherein said control means includes a switch mounted on said control member.

7. A copying apparatus for varying the magnification of images projected from an original onto a recording member comprising:

an original carriage;

drive means to reciprocate said original carriage at varying velocities;

means for producing an image of said original;

optical means for projecting the image from a scanning position, said optical means including a mirror and lens combination movable to vary the magnification of the projected image and wherein said scanning position varies with movement of said mirror and lens combination;

means for moving the recording member past the projected image to thereby form a image on the recording member;

control means operatively connected to said mirror and lens combination to actuate said moving means in accordance with the position of said mirror and lens combination; and magnification changing means for simultaneously controlling the movement of the mirror and lens combination, the position of said control means and the drive velocity for said driving means in accordance with a desired magnification of the original image.

* * * * *

UNITED STATES PATENT AND TRADEMARK OFFICE
CERTIFICATE OF CORRECTION

PATENT NO. : 4,007,986

DATED : February 15, 1977

INVENTOR(S) : SHIGEHIRO KOMORI, ET AL

It is certified that error appears in the above-identified patent and that said Letters Patent are hereby corrected as shown below:

Column 4, line 10, delete "for f=180mm"

Column 6, line 20, "a" first occurrence, should read --an--

Column 6, line 40, "in" should read --on--

Signed and Sealed this

Twenty-fourth Day of May 1977

[SEAL]

*Attest:*

RUTH C. MASON
*Attesting Officer*

C. MARSHALL DANN
*Commissioner of Patents and Trademarks*